United States Patent [19]
Fischer et al.

[11] Patent Number: 5,720,792
[45] Date of Patent: Feb. 24, 1998

[54] ORGANIC FERTILIZER AND METHOD OF MANUFACTURING IT

[75] Inventors: Klaus Fischer, Grillenburg; Joachim Katzur, Luebben/Spreewald; Rainer Schiene, Tharandt, all of Germany

[73] Assignee: Technische Universitaet Dresden, Dresden, Germany

[21] Appl. No.: 525,571

[22] PCT Filed: Mar. 18, 1994

[86] PCT No.: PCT/DE94/00310

§ 371 Date: Feb. 16, 1996

§ 102(e) Date: Feb. 16, 1996

[87] PCT Pub. No.: WO94/21576

PCT Pub. Date: Sep. 29, 1994

[30] Foreign Application Priority Data

Mar. 19, 1993 [DE] Germany ............ 43 08 951.8

[51] Int. Cl.$^6$ .................................................. C05F 7/02
[52] U.S. Cl. ............................. 71/11; 71/23; 71/25
[58] Field of Search ............................ 71/11, 30, 23, 71/24, 25, 26

[56] References Cited

U.S. PATENT DOCUMENTS

| | | | |
|---|---|---|---|
| 4,002,457 | 1/1977 | Sears et al. | 71/25 |
| 5,443,613 | 8/1995 | Robinson | 71/12 |

FOREIGN PATENT DOCUMENTS

| | | | |
|---|---|---|---|
| 553413 | 6/1932 | Germany. | |
| 1302961 | 4/1972 | Germany. | |
| 0289040 | 4/1991 | Germany | 91/116 |
| 289040A5 | 4/1991 | Germany. | |

OTHER PUBLICATIONS

Meier, Dietrich "Conversion of Technical Lignins Into Slow–Release Nitrogenous Fertilizers by Ammoyidation in Liquid Phase" Bioresource Technology (1994) 49(2) 121–8 (no month).

Chemistry and Industry, 16 Jun. 1973 p. 553, "Slow releasing nitrogen fertiliser from the waste product, lignin sulphonates" by Wolfang Flaig.

Primary Examiner—Ferris Lander
Attorney, Agent, or Firm—Jordan and Hamburg

[57] ABSTRACT

The invention concerns a high-grade, long-duration, organic fertilizer and a method of manufacturing it by the oxidative ammonolysis of industrial lignin. The fertilizer contains nitrogen in the form of ammonium compounds, normally hydrolyzable amides and more strongly bound organic nitrogen. The proportion of more strongly bound organic nitrogen is 55 to 85%, preferably 65 to 80%, relative to the total nitrogen content of the fertilizer. The manufacturing process uses industrial lignin precipitated under alkaline conditions from alkaline waste liquors, extracts or solutions. Preliminary tests have confirmed that this process gives a natural-like, high-grade, long-duration fertilizer similar to humus in character and with surprisingly good environmental compatibility.

8 Claims, No Drawings

ORGANIC FERTILIZER AND METHOD OF MANUFACTURING IT

This application claims benefit of the filing date of International Application PCT/DE94/00310, filed Mar. 18, 1994.

The invention concerns a high-quality, natural-like, organic, long-term fertilizer of the humus type, which has surprisingly good environmental compatibility, and a procedure to produce it by oxidative ammonolysis of technical lignin.

It is already known to transform technical lignins with ammonia as a basic component and oxidants, preferably air or oxygen-containing gas mixtures.

Fertilizers obtained in this way under pressures up to 15 MPa and at temperatures above 100° C. and up to 240° C. (e.g. DE-OS 17 45 632 or 28 11 235) are of a high nitrogen content. However, their fertilizing effect is low. Obviously, the chemical bonding of nitrogen in the molecule is decisive.

According to DD 235 250, the reaction mixture reacts with vivid foam formation at atmospheric pressure and temperatures up to 99° C.

Nitrogen distribution to various types of bondings is purposefully influenced by DD 289 040. The content of ammonia nitrogen, with regard to the total nitrogen content, is 35%–65%. The percentage of the stronger organically bonded nitrogen amounts to 24–45%. In this context as in the following, stronger organically bonded nitrogen means the organic nitrogen content without the normally hydrolyzable amide nitrogen component. "Normal" hydrolysis was done by diluted sodium hydroxide solution under the conditions of steam distillation.

Organic fertilizers made from spent sulphite liquors by means of oxidative ammonolysis at atmospheric pressure showed an improved fertilizing effect. However, comparative tests based on the same nitrogen quantities resulted in lower yields as against urea fertilization. Depending on dosage, in case of woody plants even negative effects were observed concerning the growth.

OBJECT AND SUMMARY OF THE INVENTION

It is the aim of the invention to find an organic fertilizer of considerably improved fertilizing effect made by oxidative ammonolysis of lignin.

It was found that organic fertilizer made by oxidative ammonolysis of technical lignin has a content of stronger organically bonded nitrogen of 55–85%, preferably of 65–80%, based on the total nitrogen content of the fertilizer in each case, and that it has high-quality fertilization properties.

First fertilization tests showed the following results: the fertilization effect of urea is clearly exceeded. It persists even in the following years. Nitrogen is washed out an unexpectedly lower extent than in the case of urea fertilization, an amount clearly less than 20%. The fertilizer contains organic structures occurring in natural humic substances. The cation-exchange capacity is 30–80% compared to that of humic acids. Hence, a high-quality, natural-like, long-term fertilizer of the humus type is present with a surprisingly good environmental compatibility.

The fertilizer can be applied in combination with other mineral and organic fertilizers, among them carbon carriers, such as lignite sludges or pulverized brown coal. As it is shown in the first tests, the fertilizer mainly can be used advantageously for the recultivation of great open cuts or similar barren soils.

It was found that an organic fertilizer with a relatively high content of stronger organically bonded nitrogen can be produced when the technical lignin used for oxidative ammonolysis was precipitated from waste liquors of alkaline pulp decomposition processes or from alkaline lignin extracts and lignin solutions and under alkaline conditions, preferably at a pH value of 9. In this context, under alkaline conditions means that the precipitation of lignin is finished in the alkaline phase and the mixture of precipitated lignin and the solution is an alkaline one.

Waste liquors from various pulp decomposition processes can be used. Lignin can be directly obtained by precipitation from a waste liquor of an alkaline pulp decomposition process, e.g. from a waste liquor of an organocell decomposition. However, it is possible to alkalinely solve lignin obtained otherwise and then to precipitate lignin in the alkaline phase, e.g. lignin again from waste liquors of other organosolve processes, or in the acid phase to precipitate lignin from alkaline waste liquors. In the same way, lignin cellulose containing material occurring in the "steam-explosion" process can be solved alkalinely and precipitated from the solution in the alkaline phase.

It is advantageous to use organocell lignin and other organosolve lignin as well as that obtained by the "steam-explosion" process, because, as it is known, the decomposition is sulphur-free, hence environmental compatibility is improved.

For the first tests, laboratory equipment was used which is described in detail in the following examples. With this equipment, the fertilizer was made under atmospheric pressure. It goes without saying that the production is possible in various reactors. Additional optimizations are obvious, e.g. even by excessive pressure, mainly to reduce the reaction time and to obtain the highest possible total nitrogen content, maintaining at the same time a good fertilization effect.

DETAILED DESCRIPTION OF THE INVENTION

The invention is described in greater detail with reference to embodiments thereof.

1. Production

With the organocell process, chips of hardwood and/or softwood are cooked at 185° C. with a methanol-water mixture and then cooked at about 170° C. with methanol/water (30/70) and added sodium solution to produce pulp. The lignin dissolves. From this alkaline waste liquor the methanol is distilled off and the lignin is obtained by precipitation. For the following test the organocell lignin was precipitated according to the invention at about pH=9 and, as a comparative test, precipitated at pH=4. The fertilizers made from it will be designated as DM9 and DM4 in the following.

For the production of the fertilizers a laboratory plant was available. It consists of a vessel with connected feed pump, injector, tubular reactor and heat exchanger as well as recirculation to the vessel. 50 to 200 g of organocell lignin are dissolved in 2.0 to 3.5 l of ammonia water (up to 7%) and filled in the vessel. The reaction mixture is recirculated from the vessel through the injector, tubular reactor and heat exchanger into the vessel. On reaching the reaction temperature of 70°–82° C., the suction side of the injector is opened and oxygen or air is charged in a quantity of 30–60 liters of oxygen per hour. A reactive foam is formed, which decomposes in the vessel. On a reaction time of about 5 hours the feeding of the oxidation gas is stopped, and the reaction mixture is drawn off after a short-time cooling. The excess ammonia is distilled off in vacuo, and the product is obtained as solid matter after spray drying.

| Product composition: | | |
|---|---|---|
| Fertilizer | DM9 | DM4 |
| Carbon | 55.4–55.6% | 57.5–57.9% |
| Nitrogen, total | 3.2–3.3% | 4.2–4.3% |
| of that (referred to N, total) | | |
| Ammonium-N | 3.3–15.6% | 44.2–47.6% |
| Amide-N | 15.6–21.2% | 11.9–14.0% |
| stronger bonded N | 65.5–68.8% | 40.5–41.9% |

2. Fertilization

Test soil: sand free of humus;

Plant: mustard;

Pot tests with 1 kg absolutely dry soil;

Basic fertilizing with Mg, P, K and the micronutrients B, Mn, Cu, Zn and Mo, equal doses in all vessels.

The recommended dosage for fertilization is 0.05–0.1 M-% C based on the mass of fertilized soil.

Two harvests of four pots each were evaluated for each test. Starting from the zero sample there were compared the fertilizations with DM9, DM4 arid urea. The comparison with urea was made on the basis of equal soluble nitrogen quantities, separated according to DM9 and DM4. In accordance with the higher share of soluble nitrogen compounds, the urea mass for the comparison with DM4 is about 2.5 times greater than for the comparison with DM9. The comparison of DM9 and DM4 was made on the basis of equal weight percent of carbon in the variations of 0.05 and 0.1 M-% C (referred to the mass of fertilized soil).

The results:

| Mass of fresh matter in g from four pots each | | | | |
|---|---|---|---|---|
| | DM9 | | DM4 | |
| | 1 st harvest | 2nd harvest | 1 st harvest | 2nd harvest |
| Zero sample | 7.19 | 9.84 | 7.19 | 9.84 |
| DM (0.05 M - % C) | 12.76 | 16.78 | 9.29 | 10.92 |
| Urea | 9.45 | 6.49 | 7.85 | 16.20 |
| DM (0.1 M - % C) | 12.66 | 15.48 | 7.24 | 14.02 |
| Urea | 5.05 | 8.72 | 0 | 9.10 |

The crop yields from the tests with the fertilizer DM9 according to the invention exceed all other yields in the respective test series especially at the first harvest and even after the second. Especially great are the differences at the lowest application of fertilizer (0.05 M-% C).

Lysimeter tests showed that in the tests with DM9 as compared with those with urea only 12% of the nitrogen is washed out.

What is claimed is:

1. An organic fertilizer produced by oxidative ammonolysis of lignin precipitated under alkaline conditions comprising 55%–85% stronger organically bonded nitrogen based on the total nitrogen content.

2. The organic fertilizer as claimed in claim 1, wherein the content of the stronger organically bonded nitrogen is 65%–80% based on the total nitrogen content.

3. A method of making an organic fertilizer containing 55%–85% stronger organically bonded nitrogen comprising, precipitating technical lignin in the alkaline phase from waste liquors of alkaline pulp decomposition processes or from alkaline lignin extracts, and subjecting the precipitated lignin to oxidative ammonolysis.

4. The method as claimed in claim 3, wherein lignin is precipitated at a pH value of about 9.

5. The method as claimed in claim 3, wherein the step of subjecting the precipitated lignin to oxidative ammonolysis comprises dissolving the precipitated lignin in ammonia water and charging the solution with an oxidation gas.

6. A method of making organic fertilizer containing 55%–85% stronger organically bonded nitrogen comprising obtaining lignin from a non-alkaline pulp decomposition process or non-alkalinely precipitated lignin, dissolving the lignin in an alkaline solution, precipitating lignin from the alkaline solution, and subjecting the precipitated lignin to oxidative ammonolysis.

7. The method as claimed in claim 6, wherein lignin is precipitated at a pH value of about 9.

8. The method as claimed in claim 6, wherein the step of subjecting the precipitated lignin to oxidative ammonolysis comprises dissolving the precipitated lignin in ammonia water and charging the solution with an oxidation gas.

* * * * *